US012792049B2

(12) United States Patent
Banerjee et al.

(10) Patent No.: US 12,792,049 B2
(45) Date of Patent: Nov. 10, 2026

(54) METHOD AND SYSTEM FOR TASK FEASIBILITY ANALYSIS WITH EXPLANATION FOR ROBOTIC TASK EXECUTION

(71) Applicant: Tata Consultancy Services Limited, Mumbai (IN)

(72) Inventors: Snehasis Banerjee, Kolkata (IN); Dibyarup Dutta, Howrah (IN); Avigyan Bhattacharya, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 291 days.

(21) Appl. No.: 18/664,071

(22) Filed: May 14, 2024

(65) Prior Publication Data

US 2024/0402725 A1 Dec. 5, 2024

(30) Foreign Application Priority Data

May 31, 2023 (IN) ............................ 202321037624

(51) Int. Cl.
*G05D 1/246* (2024.01)
*G05D 1/243* (2024.01)
(Continued)

(52) U.S. Cl.
CPC ........... *G05D 1/2467* (2024.01); *G05D 1/243* (2024.01); *G05D 1/622* (2024.01); *G05D 2101/15* (2024.01); *G05D 2111/10* (2024.01)

(58) Field of Classification Search
CPC ...... G05D 1/2467; G05D 1/243; G05D 1/622; G05D 2101/15; G05D 2111/10;
(Continued)

(56) References Cited

U.S. PATENT DOCUMENTS 12,099,357 B1 * 9/2024 Ebrahimi Afrouzi ........................ B60R 25/252
2011/0288684 A1 * 11/2011 Farlow .................. B25J 11/009 901/1

(Continued)

FOREIGN PATENT DOCUMENTS

KR 20220067718 A 5/2022

OTHER PUBLICATIONS

Zhao, Yingshen, et al., "An ontology-based approach towards coupling task and path planning for the simulation of manipulation tasks", Title of the item: 15th ACS/IEEE International Conference on Computer Systems and Applications, Date: 2018, Publisher: AICSSA 2018, Link: https://www.researchgate.net/publication/328536840_An_Ontology-Based_Approach_Towards_Coupling_Task_and_Path_Planning_for_the_Simulation_of_Manipulation_Tasks.

(Continued)

*Primary Examiner* — Qun Shen
(74) *Attorney, Agent, or Firm* — Finnegan, Henderson, Farabow, Garrett & Dunner LLP

(57) ABSTRACT

This disclosure relates generally to a method and system for task feasibility analysis with explanation for robotic task execution. Conventional methods for task feasibility analysis does not utilize an ontology for task capability understanding. The present disclosure uses an explainable semantic approach for checking task feasibility in a real world. The method creates scene graphs which is further used for generating a global knowledge graph and a semantic map. These are used for task feasibility analysis for an input task instruction received from a user. When the user provides the task instruction the method checks whether it is feasible or not. This helps in avoiding dead end tasks and provides the user to alter the task instruction towards feasible task. The
(Continued)

disclosed method is used for robotic task execution in an environment.

17 Claims, 4 Drawing Sheets

(51) Int. Cl.
*G05D 1/622* (2024.01)
*G05D 101/15* (2024.01)
*G05D 111/10* (2024.01)

(58) Field of Classification Search
CPC ........ G06F 40/56; G06F 40/30; B25J 9/1697; G06N 20/00; G06N 5/022; G06V 20/10
See application file for complete search history.

(56) References Cited

U.S. PATENT DOCUMENTS

| | | | | |
|---|---|---|---|---|
| 2020/0089251 | A1* | 3/2020 | Golestan Irani | G06F 3/167 |
| 2020/0331146 | A1* | 10/2020 | Vu | G06T 19/20 |
| 2021/0096579 | A1* | 4/2021 | Artes | G05D 1/246 |
| 2021/0382497 | A1* | 12/2021 | Zhi | G05D 1/0219 |
| 2022/0083074 | A1* | 3/2022 | Ferrer | G05D 1/0253 |

OTHER PUBLICATIONS

Diab, Mohammed et al., "PMK—A Knowledge Processing Framework for Autonomous Robotics Perception and Manipulation", Title of the item: Sensors, Date: 2019, vol. 19; Issue: 5, Publisher: MDPI, Link: https://www.mdpi.com/1424-8220/19/5/1186.

Diab, Mohammed et al., "FailRecOnt—An Ontology-Based Framework for Failure Interpretation and Recovery in Planning and Execution", Title of the item: 2nd International Workshop on Ontologies for Autonomous Robotics, Date: 2021, Publisher: CEUR Workshop Proceedings, Link: https://upcommons.upc.edu/bitstream/handle/2117/357471/paper81-RobOntics.pdf?sequence=1.

Diab, Mohammed et al., "An Ontology for Failure Interpretation in Automated Planning and Execution", Title of the item: Sensors (Basel), Date: 2017, Link: https://upcommons.upc.edu/bitstream/handle/2117/176684/2019-ROBOT-An_Ontology_for_Failure_Interpretation_and_Recovery_in_Automated_Planning_and_Execution_DiabEtAl.pdf.

* cited by examiner

METHOD AND SYSTEM FOR TASK FEASIBILITY ANALYSIS WITH EXPLANATION FOR ROBOTIC TASK EXECUTION

PRIORITY CLAIM

This U.S. patent application claims priority under 35 U.S.C. § 119 to: Indian patent application No. 202321037624, filed on May 31, 2023. The entire contents of the aforementioned application are incorporated herein by reference.

TECHNICAL FIELD

The disclosure herein generally relates to the field of autonomous robotic task execution, and, more particularly, to a method and system for task feasibility analysis with explanation for robotic task execution.

BACKGROUND

Autonomous robots are developed for executing a variety of complex tasks in different environment conditions including indoor and outdoor spaces. The robots need to execute all the assigned tasks in an intelligent way, in the respective environment spaces. The autonomous robot must be able to adapt any unpredictable changes and exceptional scenarios while trying to execute the assigned tasks. Also, if the robot is not able to perform the task in these scenarios, it must find an alternative way to execute the task or provide the user an explanation of its failure.

A task instruction provided by a user to the robot for execution comprises different type of tasks such as navigation and manipulation. For example, a task where given input of text based user instruction is like ‘go to the dining room’, a robot starting at a random location is required to reach in the vicinity of the target location (here, a dining table) in an unseen indoor scene. The actuation part of this task only contains navigation from a start location to a target location. On the other hand, another instruction like ‘bring the apple from dining table’ requires a robot to first reach the target location and then, hand hold and pick the object (apple) using its manipulation capabilities and bring back the apple to the user. So this instruction involves, firstly navigation to the target location, secondly the manipulation of the object, and finally bringing the object back to user’s location (the target now is the user’s original location). To achieve this, knowledge about the indoor environment, the types of objects it contains, and general relationships of objects with other objects and objects with regions, is required to be learnt or known apriori.

When the robot faces situations which it did not expect in the environment, it may fail to execute required actions. Such unexpected situations are caused by the presence of uncertain, dynamic and complex environments. Existing robotic task execution systems do not provide solutions to check whether task instruction provided by the user is executable or not in an uncertain environment. This will lead to increased execution of time and power consumption.

SUMMARY

Embodiments of the present disclosure present technological improvements as solutions to one or more of the above-mentioned technical problems recognized by the inventors in conventional systems. For example, in one embodiment, a method for task feasibility analysis with explanation for robotic task execution is provided. The method includes receiving, via a camera, a plurality of image frames comprising a first set of objects in a current field of view of the camera of a context, wherein the camera is mounted on a robot. Further the method includes, receiving, via an odometer, coordinates of a current location of the robot and receiving, a task instruction comprising a plurality of tasks to be performed by the robot wherein the plurality of tasks comprises a second set of objects. Further the method includes creating a semantic map and a global knowledge graph by processing the plurality of image frames based on at least one of (i) a set of spatial relationship between a plurality of objects in the first set of objects (ii) a set of inter-relationships among the plurality of objects in the first set of objects (iii) a set of attributes associated with each of the plurality of objects in the first set of objects and (iv) a set of semantic attributes of the first set of objects. Then the method analyzes a task feasibility for each task of the plurality of tasks utilizing the semantic map and an ontology wherein the task feasibility comprises determining each task of the plurality of tasks as feasible or non-feasible. Furthermore, the method includes generating a semantic explanation for each task of the plurality of tasks determined as non-feasible. Further the method includes executing by the robot at least one of (i) a navigation and (ii) a manipulation for each task of the plurality of tasks determined as feasible.

In another aspect, a system for task feasibility analysis with explanation for robotic task execution is provided. The system comprises a camera located on the robot configured to provide a plurality of image frames as the robot moves, an odometer located on the robot configured to record coordinates of a current location of the robot, a user interface for providing a task instruction comprising a plurality of tasks to be performed by the robot, memory storing instructions, one or more communication interfaces, and one or more hardware processors coupled to the memory via the one or more communication interfaces, wherein the one or more hardware processors are configured by the instructions to create a semantic map and a global knowledge graph by processing the plurality of image frames based on at least one of (i) a set of spatial relationship between a plurality of objects in the first set of objects (ii) a set of inter-relationships among the plurality of objects in the first set of objects (iii) a set of attributes associated with each of the plurality of objects in the first set of objects and (iv) a set of semantic attributes of the first set of objects. Further the system includes to analyze a task feasibility for each task of the plurality of tasks utilizing the semantic map and an ontology wherein the task feasibility comprises determining each task of the plurality of tasks as feasible or non-feasible. Furthermore, the system includes to generate a semantic explanation for each task of the plurality of tasks determined as non-feasible. Further the system includes to execute by the robot at least one of (i) a navigation and (ii) a manipulation for each task of the plurality of tasks determined as feasible.

The plurality of tasks is in a natural language text. The input medium can also be speech or gestures converted to text by a processing unit. The task instruction is converted to a plurality of subject-predicate-object triplets. Creating the semantic map and the global knowledge graph comprises generating a plurality of scene graphs for a predefined time interval. The step of generating each of the plurality of scene graphs at each of a plurality of time instances of the predefined time interval includes processing the plurality of image frames using an ensemble of pre-trained machine learning models to create a first scene graph wherein the first scene graph comprises (i) the first set of objects represented as one or more nodes of the first scene graph and (ii) the set of spatial relationship between the plurality of objects in the first set of objects represented as one or more edges of the first scene graph. Further the plurality of image frames is processed using a deep image captioning technique to create a second scene graph. The second scene graph comprises (i) the first set of objects represented as one or more nodes of the second graph and (ii) the set of inter-relationship among the plurality of objects in the first set of objects represented as one or more edges of the second scene graph. Further the plurality of image frames is processed using a color and shape detection algorithm to create a third scene graph. Furthermore, a set of semantic attributes represented as resource description framework (RDF) facts corresponding to the first set of objects is processed to create a fourth scene graph.

Further the plurality of scene graphs is merged using a merging algorithm to generate the global knowledge graph. Furthermore, the semantic map is generated using the global knowledge graph and the coordinates of the current location of the robot.

The set of attributes corresponds to one or more color and one or more shape of each of the plurality of objects in the first set of objects. Each task of the plurality of tasks is determined as non-feasible by determining a failure of each of the plurality of tasks for at least one of (i) a type 1 feasibility, (ii) a type 2 feasibility, (iii) a type 3 feasibility, and (iv) a type 4 feasibility. The type 1 feasibility is associated to a semantic data corresponding to the plurality of tasks. Further the type 2 feasibility corresponds to a set of static information of the context. Furthermore, the type 3 feasibility is associated to a set of dynamic pre-conditions corresponding to the plurality of tasks. Further the type 4 feasibility is based on a set of pre-anticipated conditions is checked corresponding to the plurality of tasks.

The semantic explanation to the user is provided by initially converting the plurality of tasks into a word vector using a text vectorization technique. Then a first set of explanation texts is generated using one or more large language models from at least one of (i) the word vector (ii) a scene graph for the current field of view of the robot (iii) the semantic map and (iv) the ontology wherein each explanation text of the first set of explanation texts is associated with a first confidence score. Further a second set of explanation texts is generated using a set of inference rules from at least one of (i) the plurality of subject-predicate-object triplets (ii) a scene graph for the current field of view of the robot (iii) the semantic map and (iv) the ontology wherein each explanation text of the second set of explanation texts is associated with a second confidence score. Further using a scoring network, the first set of explanation texts and the second set of explanation texts is ranked to obtain a set of ranked explanation texts wherein each ranked explanation text of the set of ranked explanation texts is associated with a probability score. Furthermore, a plurality of ranked explanation texts of the set of ranked explanation texts is merged based on a distance metric to obtain a set of merged explanation texts. Finally, a final explanation text is obtained from the set of merged explanation texts based on the probability score.

In yet another aspect, there is provided a computer program product comprising a non-transitory computer readable medium having a computer readable program embodied therein, wherein the computer readable program, when executed on a computing device causes the computing device for task feasibility analysis with explanation for robotic task execution by receiving, via a camera, a plurality of image frames comprising a first set of objects in a current field of view of the camera of a context, wherein the camera is mounted on a robot. Further the computer readable program includes, receiving, via an odometer, coordinates of a current location of the robot and receiving a task instruction comprising a plurality of tasks to be performed by the robot wherein the plurality of tasks comprises a second set of objects. Further the computer readable program includes creating a semantic map and a global knowledge graph by processing the plurality of image frames based on at least one of (i) a set of spatial relationship between a plurality of objects in the first set of objects (ii) a set of inter-relationships among the plurality of objects in the first set of objects (iii) a set of attributes associated with each of the plurality of objects in the first set of objects and (iv) a set of semantic attributes of the first set of objects. Further the computer readable program includes analyzing a task feasibility for each task of the plurality of tasks utilizing the semantic map and an ontology wherein the task feasibility comprises determining each task of the plurality of tasks as feasible or non-feasible. Furthermore, the computer readable program includes generating a semantic explanation for each task of the plurality of tasks determined as non-feasible. Further the method includes executing by the robot at least one of (i) a navigation and (ii) a manipulation for each task of the plurality of tasks determined as feasible.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

An autonomous robot especially a service robot executes a task instruction provided by a user in an environment which may include navigation and manipulation tasks. However, to achieve this, knowledge about the environment is to be learnt or known apriori. For instance, the number and types of objects the environment contains, and general relationships of objects with objects and objects with regions and so on must be learnt in beforehand. One way to get this knowledge is to start with an initial knowledgebase and then adapting it based on exploration of similar scenes, and then finally deploying a model for a specific downstream task. In this case, context of task will be the state of the world model when the robot is getting the task instruction. When a user gives a task, just after the task instruction, the system can infer if the task is feasible or not based on semantic search in the knowledgebase, thereby saving time of the robotic agent to avoid dead-end tasks and hinting the user to alter the task instruction towards a feasible task.

The disclosed method uses an explainable semantic approach leveraging perception and semantic web technology to check task execution feasibility in realistic settings. The method utilizes an ontology which contains knowledge of both robotic tasks and entities in an outdoor environment. The method utilizes this for scene context understanding or world model of the robot. The method utilizes the ontology which helps the robot to create scene graphs which are further used to create a global knowledge graph and a semantic map of the environment to aid the task feasibility analysis.

Figure 1:
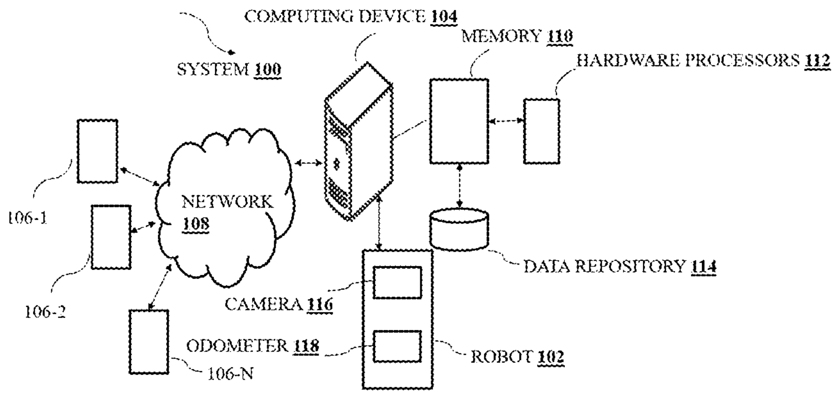
FIG. 1 illustrates an exemplary block diagram of a system for task feasibility analysis with explanation for robotic task execution according to some embodiments of the present disclosure.
Figure 2:
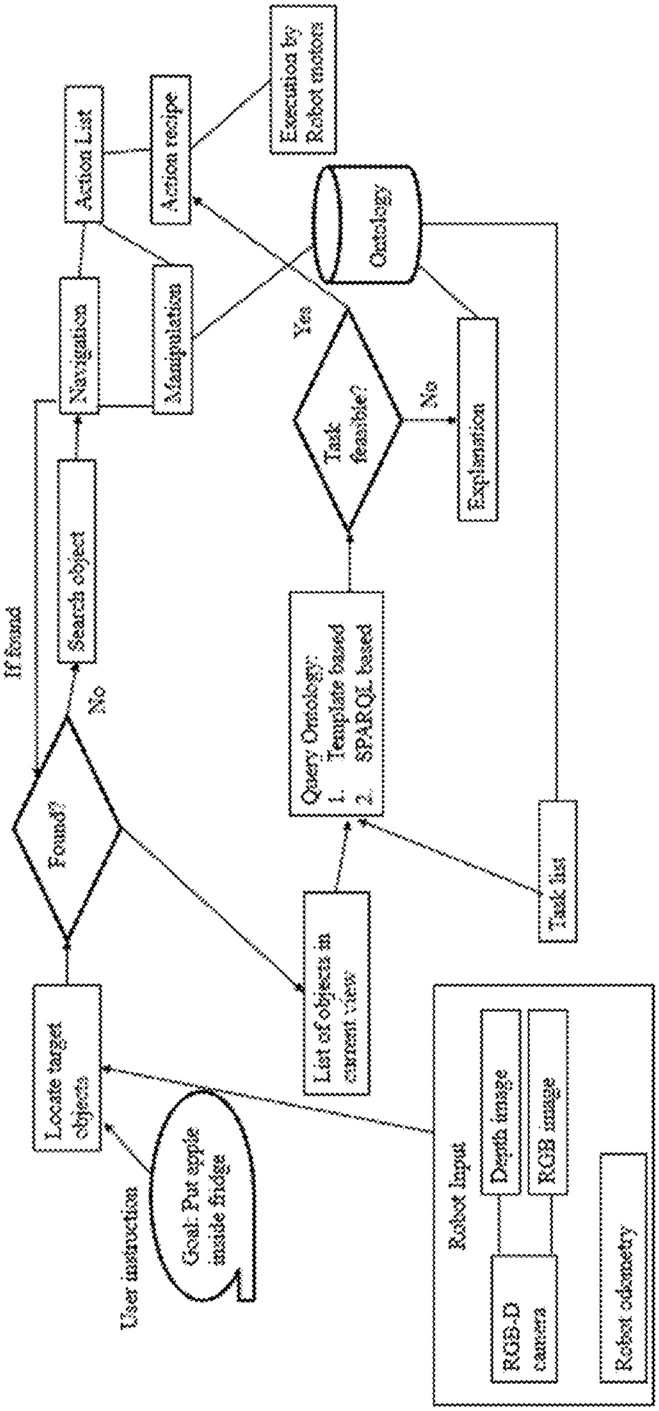
FIG. 2 illustrates a schematic diagram depicting broad-level process flow for task feasibility analysis with explanation for robotic task execution according to some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

According to an embodiment of the disclosure, FIG. 1 illustrates a block diagram of a system 100 for task feasibility analysis with explanation for robotic task execution. The robot 102 is fitted with a camera 116 and an odometer 118. In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 100 through communication links. In an embodiment, the system 100 may be a component of each robot among a plurality of robots. In another embodiment, the system 100 may be a centralized system that is in communication with different robots.

The system 100 may be implemented in a workstation, a mainframe computer, a server, and a network server. In an embodiment, the computing device 104 further comprises one or more hardware processors 112, one or more memory 110, hereinafter referred as a memory 110 and a data repository 114, for example, a repository 114. The memory 110 is in communication with the one or more hardware processors 112, wherein the one or more hardware processors 112 are configured to execute programmed instructions stored in the memory 110, to perform various functions as explained in the later part of the disclosure. The repository 114 may store data processed, received, and generated by the system 100.

In an embodiment, the memory 110 includes a plurality of modules (not shown). The plurality of modules includes programs or coded instructions that supplement applications or functions performed by the system 100 for executing different steps involved in the process of task feasibility analysis with explanation for robotic task execution by the system 100. The plurality of modules, amongst other things, can include routines, programs, objects, components, and data structures, which performs particular tasks or implement particular abstract data types. The plurality of modules may also be used as, signal processor(s), node machine(s), logic circuitries, and/or any other device or component that manipulates signals based on operational instructions. Further, the plurality of modules can be used by hardware, by computer-readable instructions executed by the one or more hardware processors 112, or by a combination thereof. The plurality of modules can include various sub-modules such as semantic web reasoning module, action recipe module and the like (not shown).

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 illustrates a schematic diagram depicting broad-level process flow for task feasibility analysis with explanation for robotic task execution according to some embodiments of the present disclosure. As depicted in FIG. 2 a user gives an instruction for a manipulation task that is deciphered into a semantic web based stream of 'subject-predicate-object' conditional states. The robot has a set of continuous inputs at its disposal, namely, Red Green Blue Channels-Depth channel (RGB-D) or RGB camera sensor, wheel odometry readings, hand grasper co-ordinates and the sensor states. For a given task like placing an apple in the fridge, the system initially checks if a target object requiring manipulation is already there in the current field of view of robot ego view camera. The detection is done using standard object detection techniques like YOLO (from published paper titled "Object detection using yolo: Challenges, architectural successors, datasets and applications" authored by "T. Diwan, G. Anirudh, and J. V. Tembhurne" in "Multimedia Tools and Applications", 2022). If the object is found to be missing or is out-of-view, the system 100 performs a 'Search and Find' of the object or the 'ObjectNav' task via robot traversal, till the object comes in robot's camera's field of view.

The system utilizes the ontology for task feasibility analysis. The ontology is not manually written by humans, instead it is augmented from external knowledge store like DBPedia and ontology entanglement techniques based on web mining on a vocabulary comprising an initial seed ontology and scene graph entities. When the object is in the current view state, the system 100 queries the ontology (herein after interchangeably used as ontology graph) to see a match between the robot capability, target object property and the task type extracted from user instruction. This query can be done either by a set of registered SPARQL (SPARQL Protocol and RDF Query Language) queries or by using template based matching. However, template based matching has the drawback of knowing the task type very specifically. In contrast, SPARQL, being a semantic high level query language, enables expression of complex logic easier in terms of query pattern stacking. The idea is to query the ontology graph's nodes and edge properties to find a pattern match in terms of a sequence of steps involved in the user instruction in relation to the predicates of the original task instructed by the user. If the task is not feasible, an explanation will be generated at runtime either by annotations tagged to specific task failures or a chain of missing conditions for failing the task, even before start of the task execution. This saves significant task execution time and avoids dead-end situations at runtime. As an example, if a high level task has five sub-tasks and even one of them, say a last one in the sequence of the high level tasks, is not feasible, the robot should not waste effort to carry out the initial four sub-tasks and then ending up in a state of non-feasible task. This decision should be taken at the start of the task. If the task is feasible, the robot will look up the task execution list to see which of the sub-task needs to be done, and in what sequence, and involving what entities. The list of task actions and its mapping to actual robotic movements is stored in an Action Recipe module, that acts as a wrapper on top of the actual physical world actuation of a robot. As an example, the high level action 'go forward' will be mapped to moving the robot motor wheels forward by some pre-set distance or instructed distance estimate. Final stage is execution by robot motors in hand (wheels in case of navigation) till goal state as per user instruction is reached.

Another aspect is the finding of task non-feasibility (tasks that cannot be performed by the robot in the context) at the time of task execution due to changes in world. Non-feasible tasks can be categorized as, a) Out of vocabulary tasks-tasks that cannot be completed due to lack of any prior semantics matching in the ontology (example, turning on the car engine)
b) Absurd tasks—these tasks cannot be done based on general concepts description (example, put table on cup)
c) Constraint Failing Tasks: each operation of the robot in the physical world has some feasibility checks or constraints in place in the given context. Some examples of task failures are: (a) when the target object is not in this particular indoor layout (b) the robot is asked to do a task that this version and model of the robot is incapable to do due to lack of capability, like, say stirring the sugar water; or climbing stairs for a wheeled robot (c) the target object does not have a matching attribute, like say asking an air conditioner to control the humidity of the room, but this object model does not support this feature.

Additionally, failures can happen at a final actuation cycle as robots are physical objects and are prone to moving motor parts setbacks and physical sensor errors. For example, the robot at the start time found that the task given in FIG. 2 is feasible. But at an intermediate or at a last step, it finds the fridge door locked and hence is unable to place the object 'apple' inside the fridge. This information of locked door state of fridge is an observation during actuation and was not already known to the robot before the task instruction was given. The system 100 in such a case, can search for a solution by a SPARQL query to list down most likely solutions like calling a human in the location to unlock the fridge. The solution can be of two types: (a) needs human to solve one or more sub-task step so that the robot can continue with the task execution (b) the robot can take alternate branch path for task execution (c) the robot can query the knowledgebase with current context to get a fresh set of task action sequence which is feasible and will take the robot out of this dead-end. Once a task is found to be infeasible, the reason for the task halt is gathered in terms of a SPARQL query to find the missing links between the goal state of the instruction and the current context scene. The detailed explanation of task feasibility analysis with explanation is explained in conjunction with FIG. 3A and FIG. 3B.

Figure 3A:
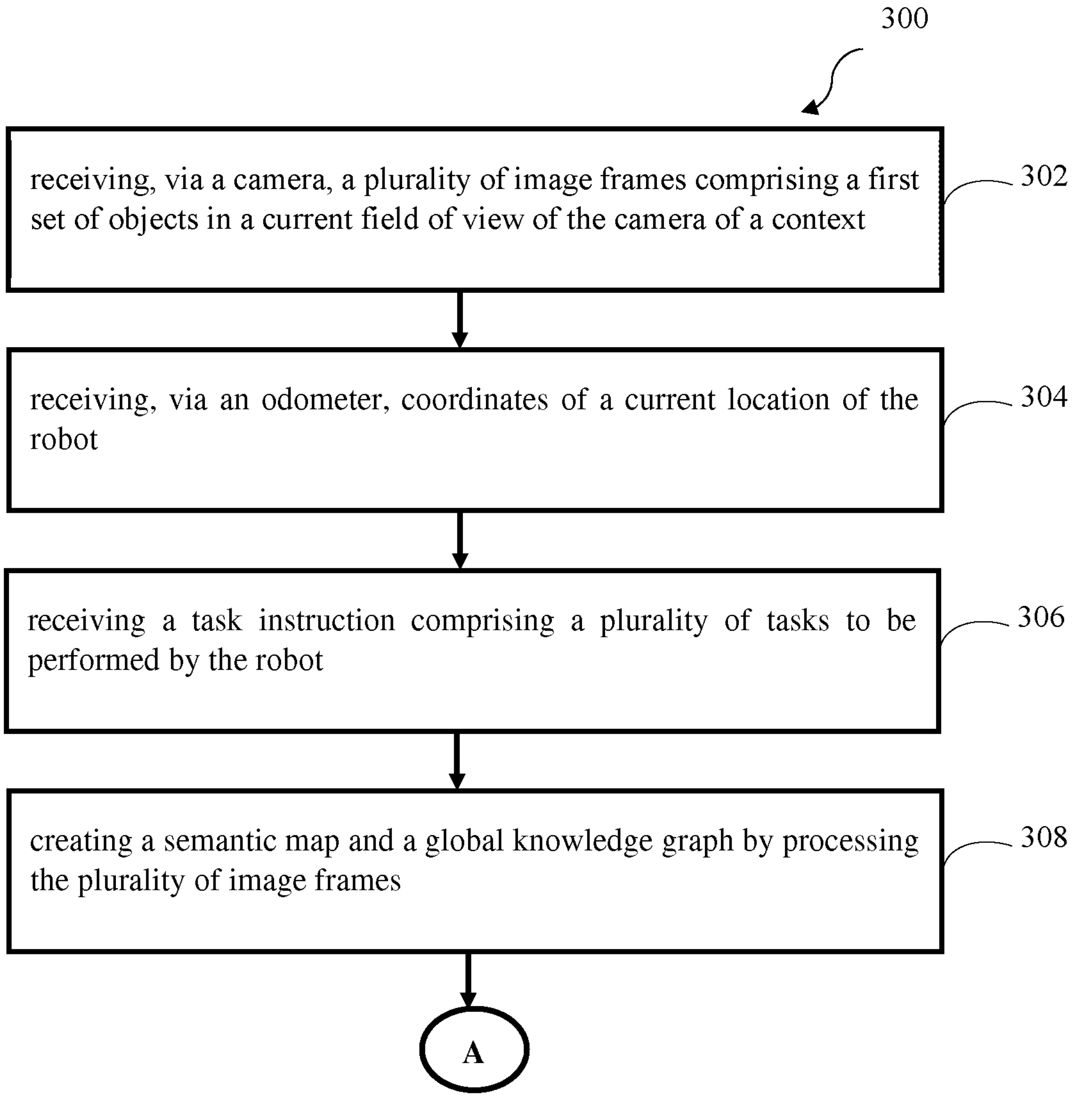
FIG. 3A and FIG. 3B (collectively referred as FIG. 3) is an exemplary flow diagram for a method for task feasibility analysis with explanation for robotic task execution in accordance with some embodiments of the present disclosure.
Figure 3B:
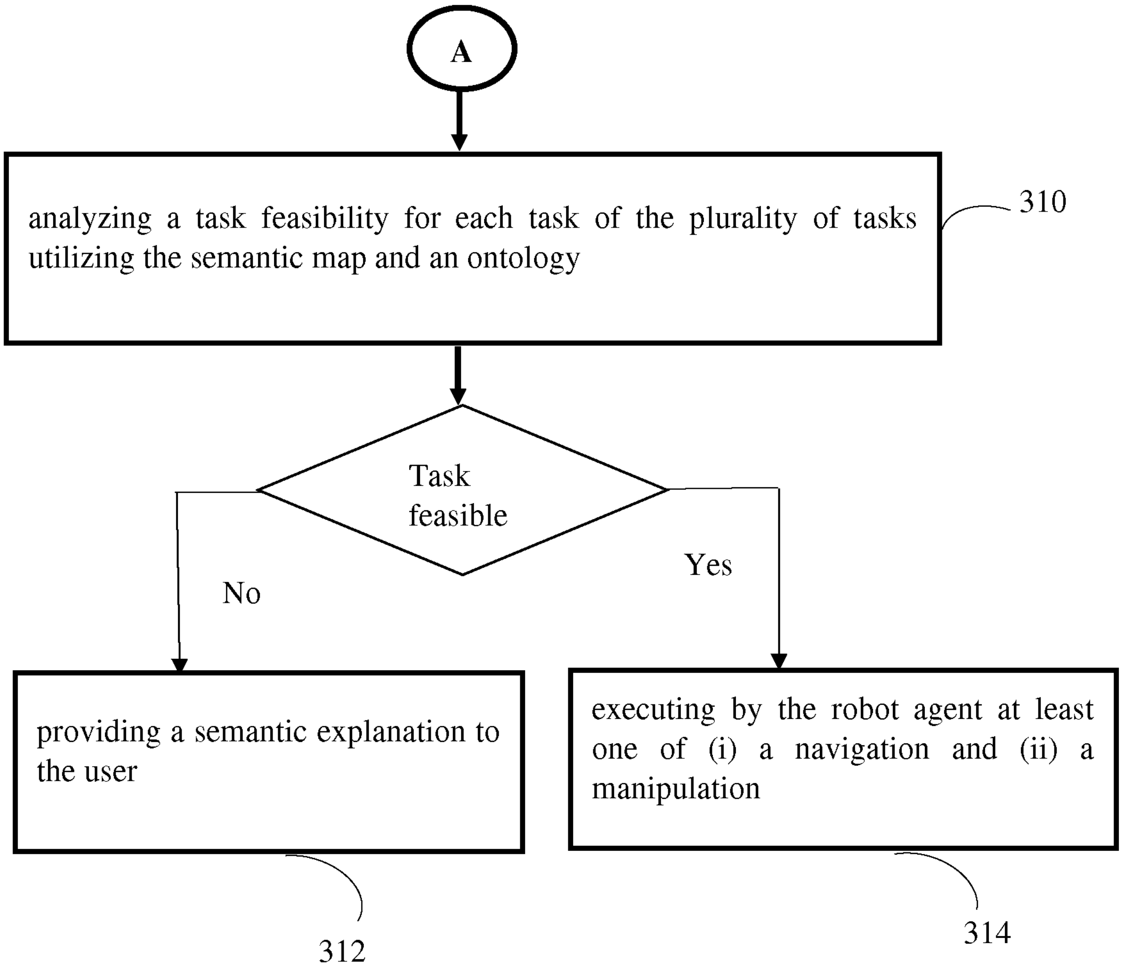

FIG. 3A and FIG. 3B (collectively referred as FIG. 3) is an exemplary flow diagram for a method for task feasibility analysis with explanation for robotic task execution in accordance with some embodiments of the present disclosure.

In an embodiment, the system 100 comprises one or more data storage devices or the memory 104 operatively coupled to the one or more hardware processor(s) 102 and is configured to store instructions for execution of steps of the method 300 by the processor(s) or one or more hardware processors 102. The steps of the method 300 of the present disclosure will now be explained with reference to the components or blocks of the system 100 as depicted in FIG. 1 and the steps of flow diagram as depicted in FIGS. 3A and 3B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300, the one or more hardware processors 102 are configured to receive, via a camera, a plurality of image frames comprising a first set of objects in a current field of view of the camera of a context, wherein the camera is mounted on a robot. The camera mounted on a robot is an RGB-D (Red-Green-Blue color channels and Depth channel) camera. The RGB-D camera perception consists of (a) RGB colored image sequences of what the robot is seeing from ego view and (b) The Depth camera estimate that assigns distances to points in an observed image (due to noise and sensor errors, only distances up to 2.5 meter is considered as correct values, rest are ignored).

At step 304 of the method 300, the one or more hardware processors 102 are configured to receive via an odometer, coordinates of a current location of the robot. The position of the robot in the world are expressed in terms of (x, y, $\theta$)—where x, y are the 2-D coordinates in a floor space, $\theta$ is an angle relative to east where the robot is pointing. A manipulator position of the robot is also considered consisting of the robot body section (robot's odometry coordinate) and the location of the arm of the robot is x, y, z as the arm will be in 3-D space at a rotation angle ($\alpha$, $\beta$, y) relative the corresponding 3-D coordinate axes.

At step 306 of the method 300, the one or more hardware processors 102 are configured to receive from a user, a task instruction comprising a plurality of tasks to be performed by the robot wherein the plurality of tasks comprises a second set of objects. The second set of objects may be same, different or a subset of the first set of objects. The task instruction is converted to a plurality of subject-predicate-object triplets. The plurality of tasks is in the form of a natural language text. If the task instruction received in the form of a speech or a gesture, then the speech or the gesture is converted to the corresponding natural language textual input. The task instruction is converted into <Subject><Predicate><Object> format, like if the task instruction is "take the cup to the table" it becomes in form <Subject: Cup><Predicate: TaskMove><Object: Table>. If there are multiple tasks, a series of triplets will get extracted.

At step 308 of the method 300, the one or more hardware processors 102 are configured to create a semantic map and a global knowledge graph by processing the plurality of image frames based on at least one of (i) a set of spatial relationship between a plurality of objects in the first set of objects (ii) a set of inter-relationships among the plurality of objects in the first set of objects (iii) a set of attributes associated with each of the plurality of objects in the first set of objects and (iv) a set of semantic attributes of the first set of objects. Initially for creating the semantic map and the global knowledge graph, the method 300 generates a plurality of scene graphs for a predefined time interval. Here each of the plurality of scene graphs is generated at each of a plurality of time instances of the predefined time interval. The generation each of the plurality of scene graphs at each of the plurality of time instances comprises, initially creating a first scene graph (S1) by processing the plurality of image frames using an ensemble of pre-trained machine learning models. The first scene graph comprises (i) the first set of objects represented as one or more nodes of the first scene graph and (ii) the set of spatial relationship between the plurality of objects in the first set of objects represented as one or more edges of the first scene graph. The set of spatial relationships between the first set of objects are learned based on depth channel perception from the camera of the robot.

Further a second scene graph (S2) is created by processing the plurality of image frames using a deep image captioning technique. The second scene graph comprises (i) the first set of objects represented as one or more nodes of the second graph and (ii) the set of inter-relationships among the plurality of objects in the first set of objects represented as one or more edges of the second scene graph. The output are sets of Subject-Predicate-Object pairs (e.g., A cup on the table) and object attributes (A round golden mirror). This text form inferences are converted to graph form with objects as nodes and each node having node attributes. The links between two objects are edges and this is a multi-graph as there can be more than one edge relation between object nodes like "on top of", "in proximity to".

A third scene graph (S3) is created using a set of attributes associated with each of the plurality of objects. The set of attributes corresponds to one or more color and one or more shape of each of the plurality of objects in the first set of objects. The third scene graph is created by processing the plurality of image frames using a color and shape detection algorithm. For example, if an object is detected in a scene and segmented as a subset of pixels belonging to the object class, the color and shape detection algorithm is run on those pixels. This will enable detection of a round shaped yellow colored mirror.

Further a fourth scene graph (S4) is created by processing a set of semantic attributes represented as resource description framework (RDF) facts corresponding to the first set of objects. There is additional information around an object that cannot be learned from the scene or by applying algorithms. This information includes high level semantic attributes of the object like purpose, for example, a cup is used to store liquid, and that liquid can be tea, coffee or some other liquid form. Also, generally water is not stored in a cup, though being liquid. This information is represented as RDF facts in the form triples of subject-predicate-object, and also in ontology format. This additional information serves as extra nodes and edges of a scene graph. Like, <subject: cup><predicate: canHold><object: liquid>. So 'canHold' is the edge connecting the nodes 'cup' and 'liquid'.

Further each of the plurality of scene graphs for each of the plurality of time instances is generated by merging the first scene graph, the second scene graph, the third scene graph and the fourth scene graph using an aggregation function that merges graphs $f(S1, S2, S3, S4) \rightarrow S$, so that node and edge duplicates are avoided, and low weight and noisy edges are removed. A relation has high weight if it is established in more than one graph among S1 to S4. The resultant graph S is used to represent the current observed scene from the ego view of the camera. Thus, the scene graph $S_t$ is observed at a time instant t. In time t+x, where x is the time step, another scene graph $S_x$ is obtained.

The plurality of scene graphs at different time instances are merged using a merging algorithm to generate the global knowledge graph. The merging function is of the form $f(S, S_t, S_{t+1}, S_{t+2}, S_{t+3}, S_{t+n}) = S_c$, where a sequence of scene graphs from time instant t to n is merged to form the global knowledge graph. This function can be implemented with graph merging algorithms, or by representing each scene graph in vector embedding space by passing through a Graph Convolutional Network and obtaining representational embeddings. Similar scene graphs will remain close together in the vector embedding space. Using cosine similarity as a metric, similar scene graphs can be merged, while distant scene graphs will be concatenated at the appropriate junction point of a group of common nodes between subsequent scenes.

Further the semantic map is created using the global knowledge graph and the coordinates of the current location of the robot. So, while the robot is observing scene $S_t$ at $(x, y, \theta)$ location, if it moves forward, it will see scene $S_x$ at $(x+\nabla x, y+\nabla y, \theta+\nabla\theta)$ location, where $\nabla$ denotes the change in the location and facing direction in 2D coordinate space. If this is a forward movement, objects in view in the earlier time step will become bigger (if not occluded) in the next time step. However, the object in the two views is the same. To understand the world, the robot creates a scene representation to map the surroundings. This map is semantic as it contains semantic information about objects. The map is broken into grids based on an approximate higher end space that the robot can cover in a typical setting. Each grid contains the point at which the robot has made the observation, looking at what direction and also what it has seen at that point. This is basically a mapping of the robot locations to scene graphs (visible objects). The semantic map of the context is used in navigation for efficiency. A grid in the semantic map can have goal region, intermediate steps, alternate paths to take (branches) and observations with no detectable object in view. This grid map, being tied to the robot's odometry, helps in faster backtracking and keeping a record of what is seen at what location and what relative angle the camera was facing at the time of observation. So, when the robot is stuck at a dead end, it can look up the nearest predicted position to go from the grid instead of exploring the whole context again.

At step 310 of the method 300, the one or more hardware processors 102 are configured to analyze a task feasibility (tasks that can be done by the robot) for each task of the plurality of tasks utilizing the semantic map and the ontology. The task feasibility comprises determining each task of the plurality of tasks as feasible or non-feasible. The system 100 identifies each task of the plurality of tasks as non-feasible if a failure occurs in checking at least one of (i) a type 1 feasibility, (ii) a type 2 feasibility, (iii) a type 3 feasibility, and (iv) a type 4 feasibility. If at least one of these type feasibility fails, the task is considered to be non-feasible. For analyzing the task feasibility, the robot initially identifies at least one object from the second set of objects using the object detection algorithm. As mentioned before, the task instruction is converted into <Subject><Predicate><Object>format. Each of the predicates of the task instruction will have some linking to the plurality of tasks to execute like the 'Move' task for object 'cup' which can be broken into 1. Find cup 2. Pick it up 3. Find table 4. Place it there. These combinations of navigation and manipulation are handled by task executor Action Recipe that maps high level actions to physical world actuation. This abstraction of Action Recipe helps to adapt to any robotic system by just having a wrapper function on top of hardware implementation. For task feasibility analysis, the type 1 feasibility is checked by querying the ontology utilizing the at least one object from the second set of objects. The type 1 feasibility is associated to a semantic data corresponding to the plurality of tasks. The initial set of tuples is matched with an ontology (knowledgebase) and templates to check if such a relation exists or not. As an example, if the instruction is to keep a table on a cup, a SPARQL query will check if the task is possible or not. If the semantics are incorrect, then the task should be stopped which represents type 1 feasibility failure. An example query is:

select? relation from KB where
{<object: table><predicate: LocatedOnTopOf><object: cup>}

If the result of the above query is null, it means the task is infeasible.

The type 2 feasibility is checked using the semantic map wherein the type 2 feasibility corresponds to a set of static information of the context. Static information includes the capabilities of the robot and the environment settings and parameters. An example is asking a robot without an arm to pick an object. In this case, instead of the general common sense based robotic ontology, a specific fact file for the current context needs to be accessed. Robot specific knowledge will get populated at the start by manual entry and the outer world of the robot is generated as a semantic map out of continuous observations. Another aspect is the presence or absence of static objects in the current scene. Once the robot explores the entire scene, it will have a world map of the environment. Next, if it is asked to execute a task like "check if TV is powered on", but the TV itself is not there in the space, then although the instruction is valid, but in this environment it is infeasible. An example query is of the form:

select? object from SemanticMapKB where
{<object: table><predicate: isPresentInWorld><object: SemanticMap>}

The type 3 feasibility is checked using the semantic map and a set of dynamic pre-conditions corresponding to the plurality of tasks. An example is when the robot is asked to pick an object cup in its arm, when it is already holding a bottle. In this case, the robot is capable of picking it up, but due to current state, it is unable to do so. An example query is:

select? state from SemanticMapKB where
{<object: robot><predicate: hasPart><object: arm>. <object: arm><predicate: hasState> ?state.? state <predicate: equals> "free" ^xsd: string}

Finally, the type 4 feasibility is checked using the semantic map based on a set of pre-anticipated conditions corresponding to the plurality of tasks. An example is trying to put a cup in a fridge whose door is locked. This is observed when the task is commanded to get executed but is not happening. An example query is:

select? state from SemanticMapKB where
{<object: fridge><predicate: hasState> "locked" ^xsd: string}

When the task feasibility checks pass, then only the actual actuation of navigation or manipulation takes place by invoking the Action Recipe module.

At step 312 of the method 300, the one or more hardware processors 102 are configured to provide a semantic explanation to the user for each task of the plurality of tasks determined as non-feasible. If one of the task feasibility analysis comprising checking the type 1 feasibility, the type 2 feasibility, type 3 feasibility, and the type 4 feasibility fails, semantic explanations are provided to the user as text descriptions regarding the failure of executing the task instruction using large language model (LLM). The semantic explanation is provided to the user by initially converting the plurality of tasks into a word vector using a text vectorization technique. Further using one or more large language models comprising BERT (Bidirectional Encoder Representation Transformer) and GPT (Generative Pre-Trained Transformer) a first set of explanation texts is generated from at least one of (i) the word vector (ii) a scene graph for the current field of view of the robot (iii) the semantic map and (iv) the ontology wherein each explanation text of the first set of explanation texts is associated with a first confidence score. This is done by querying the LLM under what conditions the given task and context can fail and obtaining a set of answers ranked by relevance score. For example, BERT gives as output some answers in the form B=<B1, B2, B3, . . . . Bn >. Also, assume GPT gives as output some answers in the form of G=<G1, G2, G3, . . . . Gn >. Each of these B and G sets will have a confidence score in the range of (0 to close to 1) linked to probable failure causes.

Further, a second set of explanation texts is generated using a set of inference rules from at least one of (i) the plurality of subject-predicate-object triplets (ii) a scene graph for the current field of view of the robot (iii) the semantic map and (iv) the ontology wherein each explanation text of the second set of explanation texts is associated with a second confidence score. The plurality of subject-predicate-object triplets, the scene graph for the current field of view of the robot, the semantic map and the ontology are provided as the input to a semantic web reasoning module that combines the power of inference rules and SPARQL queries to give out explanation with confidence score of 1. If no such path is found, then abductive reasoning is applied to generate probable second set of explanation texts with some probabilistic score. The explanations are output from either SPARQL query results run on the ontology or as output from the large language model (LLM) like BERT and GPT combined. In contrast to traditional inference mechanism, the semantic queries apply abductive reasoning on the knowledgebase to come up with possible reasons for the current state and task failure.

Post generating the first set of explanation texts and the second set of explanation texts, ranking of the same is performed using a scoring network to obtain a set of ranked explanation texts. Each ranked explanation text of the set of ranked explanation texts is associated with a probability score. The scoring network takes input the first set of explanation texts and the second set of explanation texts and ranks them based on confidence in the range of 0 to 1. The scores generated rank the explanation from highest probable to least probable, and there is a threshold cutoff score T (say 0.33) below which explanations are not passed to the next step.

Further at least one or more of ranked explanation text of the set of ranked explanation texts is merged based on a distance metric to obtain a set of merged explanation texts. There may be cases that some explanation texts are overlapping, for instance the output from different LLM models. The overlapping happens at the sentence level or semantic level. In such a scenario, based on the semantic similarity or distance metric of the group of words in the sentences, and the similarity in the latent space of the group of words in the sentences similar explanation texts is merged. In case there is a link in continuity of the words in the sentences as measured by distance based spatial closeness of sentence words in the vector space, they can be concatenated one explanation after the another. Further a final explanation text is obtained from the set of merged explanation texts based on the probability score. The final explanation text is the most probable explanation.

Initially at the robot start time, only some task failures and explanations are given as the context of the world is not fully known. With more time and exploration of the environment and evolving the global knowledge graph, the robot can evaluate more task failure conditions and their probable explanations. An example SPARQL query to draw an explanation to what set of actions can be performed in the current context is enlisted below:

select? feasible State From KB Where {? user <kb: instructionTask>? task.
? user <kb: instructionObject>? object.
? user <kb: instructionRobot>? robot.
? task <kb: hasSubStep>? actionStep.
? object <kb: TaskAction>? actionStep.
? object <kb: hasProximity>? object2.
? object <kb: hasColorAttribute>? color.
? robot <kb: hasPart>? robotPart.
? robotPart <kb: manipulate>? object.
? robotPart <kb: state>? feasible State}

At step 314 of the method 300, the one or more hardware processors 102 are configured to execute by the robot at least one of (i) a navigation and (ii) a manipulation for each task of the plurality of tasks determined as feasible. The navigation and manipulation tasks are performed by the robot using state-of-the-art techniques using artificial intelligence and visual data.

EXPERIMENTATION RESULTS: The disclosed method is tested in a simulation environment Al2Thor (with realistic scenes and physics based objects). Task action recipe generation is tested on 4 tasks: pick, place, open and close. This can be extended to further granular and higher level tasks. One assumption is that every object is reachable by the robot, as at test time, it was not considered navigation to find an out-of-view object which is assumed to be solved by the ObjectNav (from published paper titled "Object goal navigation based on semantics and rgb ego view" authored by "S. Banerjee, B. Bhowmick, and R. D. Roychoudhury" in the arxiv, 2022) task of embodied Al.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiment of present disclosure herein addresses the problem of task feasibility analysis with explanation for robotic task execution. The disclosed method 300 uses an explainable semantic approach leveraging perception and semantic web technology to check task execution feasibility. The disclosed method 300 utilizes the ontology, creates scene graphs which is further used to create the global knowledge graph and semantic map of the environment used for task feasibility analysis. If a particular task is not feasible, the disclosed method 300 provides a semantic explanation for non-feasible tasks utilizing the ontology and semantic map.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:

receiving, via a camera executed by one or more hardware processors, a plurality of image frames comprising a first set of objects in a current field of view of the camera of a context, wherein the camera is mounted on a robot;

receiving, via an odometer executed by the one or more hardware processors, coordinates of a current location of the robot;

receiving, via the one or more hardware processors, a task instruction further comprising a plurality of tasks to be performed by the robot wherein the plurality of tasks comprises a second set of objects;

creating, via the one or more hardware processors, a semantic map and a global knowledge graph by processing the plurality of image frames based on at least one of (i) a set of spatial relationship between a plurality of objects in the first set of objects (ii) a set of inter-relationships among the plurality of objects in the first set of objects (iii) a set of attributes associated with each of the plurality of objects in the first set of objects and (iv) a set of semantic attributes of the first set of objects;

analyzing, via the one or more hardware processors, a task feasibility for each task of the plurality of tasks utilizing the semantic map and an ontology, wherein analyzing the task feasibility comprises determining each task of the plurality of tasks as feasible or non-feasible;

generating, via the one or more hardware processors, a semantic explanation for each task of the plurality of tasks determined as non-feasible, wherein generating the semantic explanation comprises:

converting, via the one or more hardware processors, the plurality of tasks into a word vector using a text vectorization technique;

generating, via the one or more hardware processors, using one or more large language models, a first set of explanation texts from at least one of (i) the word vector, (ii) a scene graph for the current field of view of the robot, (iii) the semantic map, and (iv) the ontology, wherein each explanation text of the first set of explanation texts is associated with a first confidence score;

generating, via the one or more hardware processors, using a set of inference rules, a second set of explanation texts from at least one of (i) the plurality of subject-predicate-object triplets (ii) a scene graph for the current field of view of the robot (iii) the semantic map and (iv) the ontology wherein each explanation text of the second set of explanation texts is associated with a second confidence score;

ranking, via the one or more hardware processors, using a scoring network, the first set of explanation texts and the second set of explanation texts to obtain a set of ranked explanation texts wherein each ranked explanation text of the set of ranked explanation texts is associated with a probability score;

merging, via the one or more hardware processors, a plurality of ranked explanation texts of the set of ranked explanation texts based on a distance metric to obtain a set of merged explanation texts;

obtaining, via the one or more hardware processors, a final explanation text from the set of merged explanation texts based on the probability score; and executing by the robot, via the one or more hardware processors, at least one of (i) a navigation and (ii) a manipulation for each task of the plurality of tasks determined as feasible.

2. The processor implemented method as claimed in claim 1, wherein the plurality of tasks is in a natural language text.

3. The processor implemented method as claimed in claim 1, wherein the task instruction is converted to a plurality of subject-predicate-object triplets.

4. The processor implemented method as claimed in claim 1, wherein creating the semantic map and the global knowledge graph comprises, generating, via the one or more hardware processors, a plurality of scene graphs for a predefined time interval, wherein generating each of the plurality of scene graphs at each of a plurality of time instances of the predefined time interval comprises:

processing the plurality of image frames using an ensemble of pre-trained machine learning models to create a first scene graph wherein the first scene graph comprises (i) the first set of objects represented as one or more nodes of the first scene graph and (ii) the set of spatial relationship between the plurality of objects in the first set of objects represented as one or more edges of the first scene graph;

processing the plurality of image frames using a deep image captioning technique to create a second scene graph wherein the second scene graph comprises (i) the first set of objects represented as one or more nodes of the second graph and (ii) the set of inter-relationships among the plurality of objects in the first set of objects represented as one or more edges of the second scene graph;

processing the plurality of image frames using a color and shape detection algorithm to create a third scene graph;

processing a set of semantic attributes represented as resource description framework (RDF) facts corresponding to the first set of objects to create a fourth scene graph; and merging the first scene graph, the second scene graph, the third scene graph and the fourth scene graph to generate the scene graph for each of the plurality of time instances, using an aggregation function;

merging using a merging algorithm, via the one or more hardware processors, the plurality of scene graphs to generate the global knowledge graph; and creating, via the one or more hardware processors, the semantic map using the global knowledge graph and the coordinates of the current location of the robot.

5. The processor implemented method as claimed in claim 1, wherein the set of attributes corresponds to one or more color and one or more shape of each of the plurality of objects in the first set of objects.

6. The processor implemented method as claimed in claim 1, wherein determining each task of the plurality of tasks as non-feasible comprises determining a failure of each of the plurality of tasks for at least one of (i) a type 1 feasibility, (ii) a type 2 feasibility, (iii) a type 3 feasibility, and (iv) a type 4 feasibility, wherein, the type 1 feasibility is associated to a semantic data corresponding to the plurality of tasks, the type 2 feasibility corresponds to a set of static information of the context, the type 3 feasibility is associated to a set of dynamic pre-conditions corresponding to the plurality of tasks, and the type 4 feasibility is based on a set of pre-anticipated conditions corresponding to the plurality of tasks.

7. A system, comprising:

a camera, located on the robot, configured to provide a plurality of image frames as the robot moves;

an odometer, located on the robot, configured to record coordinates of a current location of the robot;

a user interface for providing a task instruction comprising a plurality of tasks to be performed by the robot;

a memory storing instructions;

one or more communication interfaces; and one or more hardware processors coupled to the memory via the one or more communication interfaces, wherein the one or more hardware processors are configured by the instructions to:

create a semantic map and a global knowledge graph by processing the plurality of image frames based on at least one of (i) a set of spatial relationship between a plurality of objects in the first set of objects (ii) a set of inter-relationships among the plurality of objects in the first set of objects (iii) a set of attributes associated with each of the plurality of objects in the first set of objects and (iv) a set of semantic attributes of the first set of objects;

analyze a task feasibility for each task of the plurality of tasks utilizing the semantic map and an ontology wherein the task feasibility comprises determining each task of the plurality of tasks as feasible or non-feasible;

generate a semantic explanation for each task of the plurality of tasks determined as non-feasible, wherein generating the semantic explanation comprises:

converting the plurality of tasks into a word vector using a text vectorization technique;

generating using one or more large language models, a first set of explanation texts from at least one of (i) the word vector (ii) a scene graph for the current field of view of the robot (iii) the semantic map and (iv) the ontology wherein each explanation text of the first set of explanation texts is associated with a first confidence score;

generating using a set of inference rules, a second set of explanation texts from at least one of (i) the plurality of subject-predicate-object triplets (ii) a scene graph for the current field of view of the robot (iii) the semantic map and (iv) the ontology wherein each explanation text of the second set of explanation texts is associated with a second confidence score;

ranking using a scoring network, the first set of explanation texts and the second set of explanation texts to obtain a set of ranked explanation texts wherein each ranked explanation text of the set of ranked explanation texts is associated with a probability score;

merging a plurality of ranked explanation texts of the set of ranked explanation texts based on a distance metric to obtain a set of merged explanation texts; and obtaining a final explanation text from the set of merged explanation texts based on the probability score; and execute by the robot at least one of (i) a navigation and (ii) a manipulation for each task of the plurality of tasks determined as feasible.

8. The system as claimed in claim 7, wherein the plurality of tasks is in a natural language text.

9. The system as claimed in claim 7, wherein the task instruction is converted to a plurality of subject-predicate-object triplets.

10. The system as claimed in claim 7, wherein creating the semantic map and the global knowledge graph comprises, generating a plurality of scene graphs for a predefined time interval wherein generating each of the plurality of scene graphs at each of a plurality of time instances of the predefined time interval comprises:

processing the plurality of image frames using an ensemble of pre-trained machine learning models to create a first scene graph wherein the first scene graph comprises (i) the first set of objects represented as one or more nodes of the first scene graph and (ii) the set of spatial relationship between the plurality of objects in the first set of objects represented as one or more edges of the first scene graph;

processing the plurality of image frames using a deep image captioning technique to create a second scene graph wherein the second scene graph comprises (i) the first set of objects represented as one or more nodes of the second graph and (ii) the set of inter-relationship among the plurality of objects in the first set of objects represented as one or more edges of the second scene graph;

processing the plurality of image frames using a color and shape detection algorithm to create a third scene graph;

processing a set of semantic attributes represented as resource description framework (RDF) facts corresponding to the first set of objects to create a fourth scene graph; and merging the first scene graph, the second scene graph, the third scene graph and the fourth scene graph to generate the scene graph for each of the plurality of time instances, using an aggregation function;

merging using a merging algorithm the plurality of scene graphs to generate the global knowledge graph; and creating the semantic map using the global knowledge graph and the coordinates of the current location of the robot.

11. The system as claimed in claim 7, wherein the set of attributes corresponds to one or more color and one or more shape of each of the plurality of objects in the first set of objects.

12. The system as claimed in claim 7, wherein determining each task of the plurality of tasks as non-feasible comprises determining a failure of each of the plurality of tasks for at least one of (i) a type 1 feasibility, (ii) a type 2 feasibility, (iii) a type 3 feasibility, and (iv) a type 4 feasibility, wherein, the type 1 feasibility is associated to a semantic data corresponding to the plurality of tasks, the type 2 feasibility corresponds to a set of static information of the context, the type 3 feasibility is associated to a set of dynamic pre-conditions corresponding to the plurality of tasks, and the type 4 feasibility is based on a set of pre-anticipated conditions corresponding to the plurality of tasks.

13. One or more non-transitory machine-readable information storage mediums comprising one or more instructions which when executed by one or more hardware processors cause:

receiving, via a camera, a plurality of image frames comprising a first set of objects in a current field of view of the camera of a context, wherein the camera is mounted on a robot;

receiving, via an odometer, coordinates of a current location of the robot;

receiving a task instruction comprising a plurality of tasks to be performed by the robot wherein the plurality of tasks comprises a second set of objects;

creating a semantic map and a global knowledge graph by processing the plurality of image frames based on at least one of (i) a set of spatial relationship between a plurality of objects in the first set of objects (ii) a set of inter-relationships among the plurality of objects in the first set of objects (iii) a set of attributes associated with each of the plurality of objects in the first set of objects and (iv) a set of semantic attributes of the first set of objects;

analyzing a task feasibility for each task of the plurality of tasks utilizing the semantic map and an ontology, wherein analyzing the task feasibility comprises determining each task of the plurality of tasks as feasible or non-feasible;

generating a semantic explanation for each task of the plurality of tasks determined as non-feasible, wherein generating the semantic explanation comprises:

converting the plurality of tasks into a word vector using a text vectorization technique;

generating using one or more large language models, a first set of explanation texts from at least one of (i) the word vector, (ii) a scene graph for the current field of view of the robot, (iii) the semantic map, and (iv) the ontology, wherein each explanation text of the first set of explanation texts is associated with a first confidence score;

generating using a set of inference rules, a second set of explanation texts from at least one of (i) the plurality of subject-predicate-object triplets (ii) a scene graph for the current field of view of the robot (iii) the semantic map and (iv) the ontology wherein each explanation text of the second set of explanation texts is associated with a second confidence score;

ranking using a scoring network, the first set of explanation texts and the second set of explanation texts to obtain a set of ranked explanation texts wherein each ranked explanation text of the set of ranked explanation texts is associated with a probability score;

merging a plurality of ranked explanation texts of the set of ranked explanation texts based on a distance metric to obtain a set of merged explanation texts; and obtaining a final explanation text from the set of merged explanation texts based on the probability score; and executing by the robot at least one of (i) a navigation and (ii) a manipulation for each task of the plurality of tasks determined as feasible.

14. The one or more non-transitory machine-readable information storage mediums of claim 13, wherein the plurality of tasks is in a natural language text.

15. The one or more non-transitory machine-readable information storage mediums of claim 13, wherein the task instruction is converted to a plurality of subject-predicate-object triplets.

16. The one or more non-transitory machine-readable information storage mediums of claim 13, wherein creating the semantic map and the global knowledge graph comprises, generating a plurality of scene graphs for a predefined time interval, wherein generating each of the plurality of scene graphs at each of a plurality of time instances of the predefined time interval comprises:

processing the plurality of image frames using an ensemble of pre-trained machine learning models to create a first scene graph wherein the first scene graph comprises (i) the first set of objects represented as one or more nodes of the first scene graph and (ii) the set of spatial relationship between the plurality of objects in the first set of objects represented as one or more edges of the first scene graph;

processing the plurality of image frames using a deep image captioning technique to create a second scene graph wherein the second scene graph comprises (i) the first set of objects represented as one or more nodes of the second graph and (ii) the set of inter-relationships among the plurality of objects in the first set of objects represented as one or more edges of the second scene graph;

processing the plurality of image frames using a color and shape detection algorithm to create a third scene graph;

processing a set of semantic attributes represented as resource description framework (RDF) facts corresponding to the first set of objects to create a fourth scene graph; and merging the first scene graph, the second scene graph, the third scene graph and the fourth scene graph to generate the scene graph for each of the plurality of time instances, using an aggregation function;

merging using a merging algorithm the plurality of scene graphs to generate the global knowledge graph; and creating the semantic map using the global knowledge graph and the coordinates of the current location of the robot.

17. The one or more non-transitory machine-readable information storage mediums of claim 13, wherein determining each task of the plurality of tasks as non-feasible comprises determining a failure of each of the plurality of tasks for at least one of (i) a type 1 feasibility, (ii) a type 2 feasibility, (iii) a type 3 feasibility, and (iv) a type 4 feasibility, wherein, the type 1 feasibility is associated to a semantic data corresponding to the plurality of tasks, the type 2 feasibility corresponds to a set of static information of the context, the type 3 feasibility is associated to a set of dynamic pre-conditions corresponding to the plurality of tasks, and the type 4 feasibility is based on a set of pre-anticipated conditions corresponding to the plurality of tasks.

* * * * *